US012585608B2

(12) United States Patent
Polisetti et al.

(10) Patent No.: US 12,585,608 B2
(45) Date of Patent: Mar. 24, 2026

(54) ARCHITECTURE TO ACHIEVE HIGHER THROUGHPUT IN SYMBOL TO WIRE STATE CONVERSION

(71) Applicant: XILINX, INC., San Jose, CA (US)

(72) Inventors: Kondala Rao Polisetti, Hyderabad (IN); Anil Kumar Chimbeti, Hyderabad (IN); Narendra Gochika, Hyderabad (IN); Narasimha Rao Marisetty, Guntur (IN)

(73) Assignee: XILINX, INC., San Jose, CA (US)

( * ) Notice: Subject to any disclaimer, the term of this patent is extended or adjusted under 35 U.S.C. 154(b) by 23 days.

(21) Appl. No.: 18/112,358

(22) Filed: Feb. 21, 2023

(65) Prior Publication Data

US 2024/0281398 A1     Aug. 22, 2024

(51) Int. Cl.
| | |
|---|---|
| *G06F 13/14* | (2006.01) |
| *G06F 13/40* | (2006.01) |
| *G06F 13/42* | (2006.01) |
| *H04L 25/02* | (2006.01) |

(52) U.S. Cl.
CPC ...... *G06F 13/4072* (2013.01); *G06F 13/4291* (2013.01); *H04L 25/0272* (2013.01)

(58) Field of Classification Search
CPC ............. G06F 13/4072; G06F 13/4291; H04L 25/0272
See application file for complete search history.

(56) References Cited

U.S. PATENT DOCUMENTS

| | | | | |
|---|---|---|---|---|
| 5,627,694 A | * | 5/1997 | Ido | H04N 5/9264 |
| 2001/0004377 A1 | * | 6/2001 | Lee | H04B 1/7075 |
| | | | | 375/E1.003 |
| 2007/0258532 A1 | * | 11/2007 | Bai | H04L 1/0071 |
| | | | | 375/261 |
| 2016/0028534 A1 | * | 1/2016 | Sengoku | H04L 7/0008 |
| | | | | 375/376 |
| 2019/0158127 A1 | * | 5/2019 | Lu | H03M 7/3066 |
| 2019/0220436 A1 | * | 7/2019 | Pitigoi-Aron | H04L 5/0046 |
| 2019/0286587 A1 | * | 9/2019 | Mishra | H04B 1/12 |
| 2020/0106457 A1 | * | 4/2020 | Chang | H03M 9/00 |
| 2023/0087897 A1 | * | 3/2023 | Chou | G06F 13/4086 |
| | | | | 375/257 |
| 2023/0236796 A1 | * | 7/2023 | Cook | H03M 7/40 |
| | | | | 708/250 |

OTHER PUBLICATIONS

MIPI Alliance, "Specification for C-PHY," sec.6.1.3.2.1, v2.0, May 28, 2019, pp. 27-28.

* cited by examiner

*Primary Examiner* — Henry Tsai
*Assistant Examiner* — Kim T Huynh
(74) *Attorney, Agent, or Firm* — Patterson + Sheridan, LLP

(57) ABSTRACT

Embodiments herein describe techniques for converting multiple symbols into respective wire states in parallel. In one embodiment, the techniques can be used to convert symbols into wire states in parallel even when those wire states are dependent on previously determined wire states. That is, the dependency on previous wire states can be removed so that wire states can be determined in parallel.

20 Claims, 4 Drawing Sheets

200

| 205 |
| --- |
| Convert TX data into a plurality of data symbols using a symbol mapper |

| 210 |
| --- |
| Transmit the plurality of data symbols to a symbol encoder |

| 215 |
| --- |
| Encode the plurality of symbols into respective wire states in parallel |

| 220 |
| --- |
| Transmit the wire states to a receiver using a serial link |

400

| Symbol | | | Rotation CW | Polarity |
|---|---|---|---|---|
| Flip | Rotation | Polarity | | |
| 0 | 0 | 0 | 2 | No Change |
| 0 | 0 | 1 | 2 | Change |
| 0 | 1 | 0 | 1 | No Change |
| 0 | 1 | 1 | 1 | Change |
| 1 | x | x | 0 | Change |

| | Symbol | Prev WS | Next WS |
|---|---|---|---|
| S0 | 000 | +x | +z |
| S1 | 001 | +z | -y |
| S2 | 010 | -y | -z |
| S3 | 001 | -z | +y |

FIG. 5

ARCHITECTURE TO ACHIEVE HIGHER THROUGHPUT IN SYMBOL TO WIRE STATE CONVERSION

TECHNICAL FIELD

Examples of the present disclosure generally relate to determining wire states for a plurality of symbols in parallel in a transmitter.

BACKGROUND

To transmit data from a transmitter to a receiver, some transmitters use a physical layer protocol where data symbols are converted into wire states, which are then transmitted on a link (e.g., a serial link comprising one or more wires) to the receiver. One such communication protocol is MIPI C-PHY which defines a physical layer protocol that uses 3-phase symbol encoding technology. These symbols are converted to wire states which are then transmitted on a serial link with three wires. MIPI C-PHY is a physical layer protocol which offers a high throughput performance over bandwidth limited channels for connecting to peripherals (displays & cameras). The 3-phase symbol encoding technology of MIPI C-PHY can deliver 2.28 bits per symbol over three wire trios.

In MIPI C-PHY, words are converted to symbols which are then converted to wire states. The wire states are sent on the three wires (called Trios). The receiver then reverses the process by converting the wire states back into symbols, and then de-mapping the symbols into data words. When converting symbols into the wire states, the current wire state is dependent on the current symbol being encoded and the previous wire state. This means the symbol encoder must know both the previous wire state and the current symbol in order to determine the wire state for the current symbol. This means converting the symbols into wire states is a sequential process where each symbol can be converted into a wire state only after the previous symbol has been converted in a wire state. Thus, at each clock cycle, the symbol encoder can at most convert one symbol into one wire state. Thus, to achieve high data speeds such as 4.5 giga-samples-per second (Gsps)), the clock must run at 4.5 GHz. However, the hardware implementing the symbol encoder may be unable to run at those high clock speeds, thereby limiting the data rate.

SUMMARY

One example is a transmitter that includes a symbol mapper comprising circuitry configured to map data into a plurality of symbols having a defined order, a symbol encoder comprising circuitry configured to convert the plurality of symbols into respective wire states in parallel where a value of each of the wire states is based on a current symbol and a previous symbol, and an interface configured to transmit the wire states to a receiver using a link.

One example is a method that includes converting data into a plurality of symbols, encoding the plurality of symbols into respective wire states in parallel where a value of each of the wire states is based on a current symbol and a previous symbol, and transmitting the wire states to a receiver using a link.

One example is a transmitter that includes a symbol mapper comprising circuitry configured to map data into a plurality of symbols having a defined order, a symbol encoder comprising circuitry configured to receive the plurality of symbols and convert the plurality of symbols into respective wire states in a same clock cycle, and an interface configured to transmit the wire states to a receiver using a link.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 4 is a truth table for the symbols, according to examples.

FIG. 5 illustrates an example of converting symbols into wire states, according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
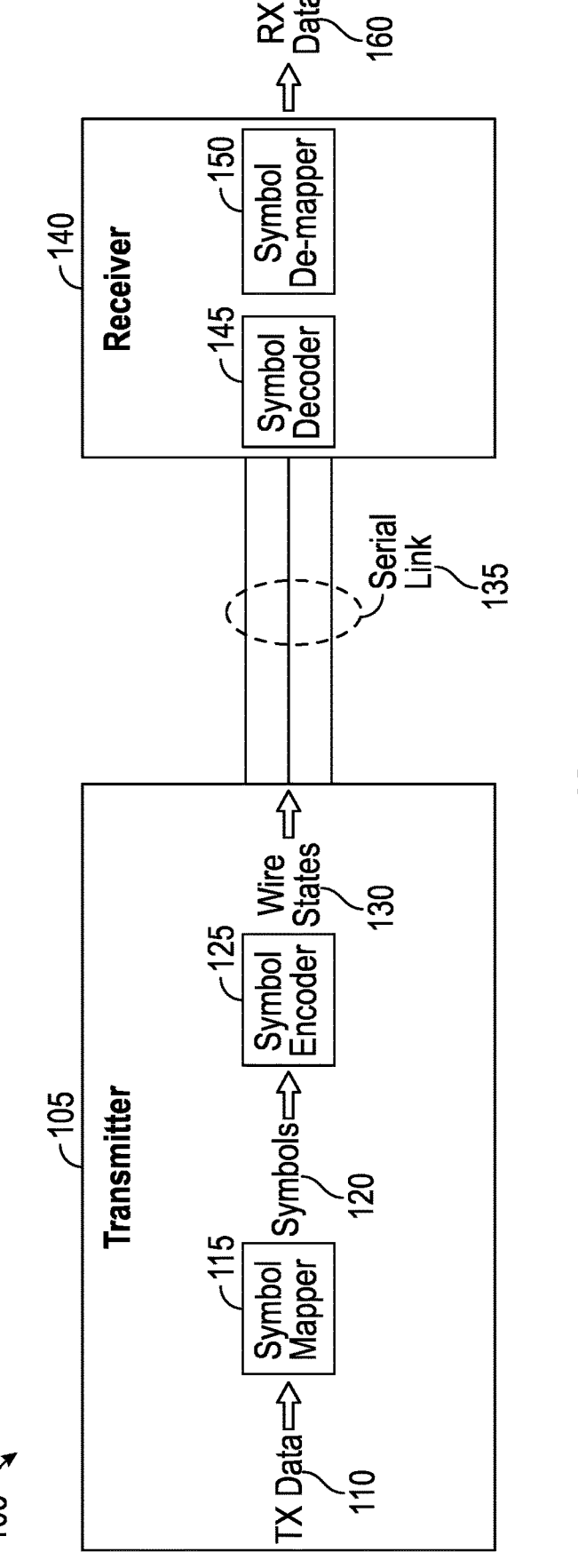
FIG. 1 is a block diagram of a communication system which converts multiple symbols into respective wire states in parallel, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for converting multiple symbols into respective wire states in parallel. In one embodiment, the techniques can be used to convert symbols into wire states in parallel even when those wire states are dependent on previously determined wire states. That is, the dependency on previous wire states can be removed (or avoided) so that wire states can be determined in parallel. In one embodiment, the system stores the last wire state from the previous set of wire states that were determined in the previous clock cycle. The bits in each symbol in the current set of symbols can then be used to determine, using the last wire state, the respective wire states. Because the system can determine the wire states in parallel, the clock can be much slower than if the hardware had to determine the wire states sequentially. For example, if the hardware can calculate 16 wire states in parallel (e.g., process 16 symbols every clock cycle), then a clock of only 281.25 MHz is needed to achieve 4.5 Gsps. Thus, the transmitter can be implemented using hardware with slower clock speeds such as a field programmable gate array (FPGA), which can reduce cost and provide greater flexibility.

FIG. 1 is a block diagram of a communication system 100 which converts multiple symbols into respective wire states in parallel, according to an example. The communication system 100 includes a transmitter 105 coupled to a receiver 140 via a serial link 135. In one embodiment, the transmitter 105 and the receiver 140 may be implemented on separate integrated circuits. For example, the transmitter 105 and the receiver 140 may be implemented using an application specific integrated circuit (ASIC) or an FPGA.

In this example, the serial link 135 includes three wires. For example, the transmitter 105 and the receiver 140 may transmit data using the three wires as a Trio defined by the MIPI C-PHY specification. However, the embodiments herein are not limited to MIPI C-PHY and the techniques described herein can be used in any protocol that converts symbols into wire states. As mentioned above, current implementations of MIPI C-PHY calculate the wire states for each of the symbols sequentially. However, the discussion below describes calculating these wire states in parallel, which enables the clock of the transmitter 105 to be much lower but still achieve high speeds.

While the embodiments herein are not limited to MIPI C-PHY, the discussion below uses MIPI C-PHY as the primary example. MIPI C-PHY uses a group of three conductors, rather than conventional differential pairs. The group of three wires is called a Lane, and the individual Lines of the Lane are called A, B and C. As such, FIG. 1 illustrates the serial link 135 having three wires. MIPI C-PHY does not have a separate clock Lane.

Within a three-wire Lane, two of the three wires are driven to opposite levels, the third wire is terminated to a mid-level (at either one end or both ends), and the voltages at which the wires are driven changes at every symbol. Multiple bits are encoded into each symbol where the data rate is ~2.28 times the symbol rate. There is no additional overhead for line coding, such as 8b10b, which is not needed.

Clock timing is encoded into each symbol. This is accomplished by stipulating that the combination of voltages driven onto the wires changes at every symbol boundary. This simplifies clock recovery. In one embodiment, the signal is received using a group of three differential receivers.

As shown in FIG. 1, the transmitter 105 receives transmit (TX) data 110 (e.g., data words) which is input into a symbol mapper 115. The symbol mapper 115 maps the TX data into a plurality of symbols. The embodiments herein are not limited to any particular type of mapping algorithm. In one embodiment, the symbol mapper 115 converts the TX data into 3-bit symbols 120. Further, the symbol mapper 115 can provide the symbols 120 to a symbol encoder 125 in parallel, or as a set of symbols. For example, the symbol mapper 115 may provide 16 symbols 120 to the symbol encoder 125 every clock cycle. However, in other embodiments, the symbol mapper 115 may provide 8, or 32 symbols 120 the symbol encoder 125 every clock cycle. Thus, the techniques described herein can scale according to the desired clock speed. For example, if the hardware implementing the transmitter 105 has higher clock speeds, then the symbol mapper 115 and the symbol encoder 125 may process fewer symbols in parallel (e.g., 8) which means less combinational logic is needed. However, if the hardware implementing the transmitter 105 has lower clock speeds, then the symbol mapper 115 and the symbol encoder 125 may process more symbols in parallel (e.g., 32) which means more combinational logic is needed in order to achieve the same data rate.

The symbol encoder 125 receives the set of symbols from the symbol mapper 115, and can output a corresponding set of wire states (WS) 130 each clock cycle. That is, the symbol encoder 125 can process the symbols 120 in parallel to output corresponding WSs 130 in parallel, even when the WS 130 for one symbol is dependent on a previous WS 130. Instead of using the previous WS, the embodiments herein can use the other symbols 120 in the set (which are received in parallel) and the last WS for the WSs determined in the previous clock cycle to determine the WSs 130 for the current clock cycle. This will be discussed in more detail below.

The WSs 130 are then transmitted using the serial link 135 to the receiver 140. That is, the transmitter 105 includes an interface which it uses to transmit the WSs 130 on the serial link 135. The receiver 140 includes a symbol decoder 145 which converts the received WSs to symbols and a symbol de-mapper 150 which maps the symbols into RX data 160. In this manner, the TX data 110 is converted into symbols, WSs, and then back into symbols and data words (e.g., RX data 160) using the communication system 100.

Figures 2, 3:
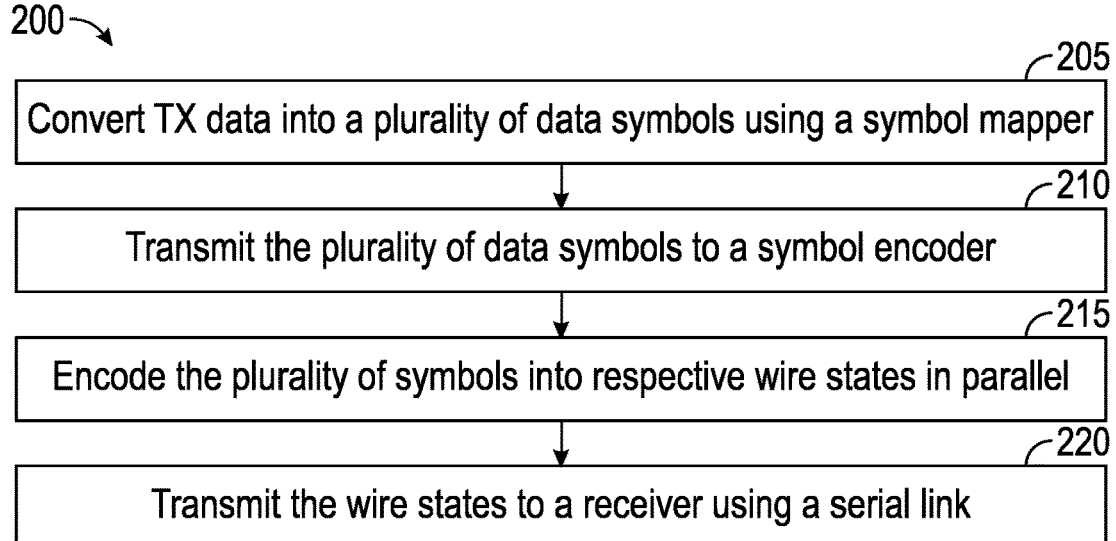
FIG. 2 is a flowchart for converting multiple symbols into respective wire states in parallel, according to an example.
FIG. 3 illustrates a state diagram of selecting wire states based on currently received symbols, according to an example.

FIG. 2 is a flowchart of a method 200 for converting multiple symbols into respective wire states in parallel, according to an example. At block 205, a symbol mapper in a transmitter (e.g., the symbol mapper 115 in FIG. 1) converts TX data into a plurality of data symbols. In one embodiment, every clock cycle, the symbol mapper outputs a set of symbols (e.g., a plurality of symbols). Further, these symbols can have a defined order—e.g., Symbol 0, followed by Symbol 1, followed by Symbol 2, etc.

At block 210, the symbol mapper transmits the plurality of data symbols to the symbol encoder (e.g., the symbol encoder 125 in FIG. 1). For example, the symbol encoder can receive a plurality of symbols from the symbol mapper each clock cycle.

At block 215, the symbol encoder encodes the plurality of symbols into respective WSs in parallel. For example, assume the symbol encoder receives Symbol 0, Symbol 1. Symbol 2, and Symbol 3 from the symbol mapper. In the next clock cycle, the symbol encoder outputs WS 0, WS 1, WS 2, and WS 3. In the conventional method of performing symbol encoding, the symbol encoder would first have to calculate WS 0 before being able to determine WS 1. That is, WS 1 is dependent on both Symbol 1 and the previous WS (i.e., WS 0). Similarly, WS 2 is dependent on both Symbol 2 and WS 1.

In the embodiments herein, the symbol encoder can convert the symbols to the WSs, but without having the WSs be dependent on the preceding WS (e.g., WS 1 depending on WS 0, WS 2 depending on WS 1, and WS 3 depending on WS 2). Instead, FIGS. 3-6 discuss techniques where the bits in the previous symbols are used to determine the WSs. For example, the bits in Symbols 0 and 1 can be used to determine WS 1, the bits in Symbols 0, 1, and 2 can be used to determine WS 2, and the bits in Symbols 0, 1, 2, and 3 can be used to determine WS 3. Thus, while the WS are dependent on the bits in other (previous) symbols in the set of received symbols, these symbols are received at the same time at the symbol encoder. Thus at the same time the encoder is determining WS 1 using the Symbols 0 and 1, it can determine WS 2 using the Symbols 0, 1, and 2, and so forth.

Moreover, the symbol encoder can also use the last WS from the previous set of WSs that was determined in the previous clock cycle. For example, the symbol encoder can save WS 3 from the set of WSs calculated in the previous clock cycle in order to calculate WS 0-3 for the current clock cycle. Thus, WS 0 for the current clock cycle may be determined using Symbol 0 and the last WS from the previous clock cycle, WS 1 for the current clock cycle may be determined using Symbols 0 and 1 and the last WS from the previous clock cycle, WS 2 for the current clock cycle may be determined using Symbols 0, 1, and 2 and the last WS from the previous clock cycle, and WS 3 for the current clock cycle may be determined using Symbols 0, 1, 2, and 3 and the last WS from the previous clock cycle. The details of this encoding are discussed in FIGS. 3-6 below.

At block 220, the symbol encoder transmits the WSs to a receiver using a serial link. For example, the serial link may operate at a higher clock speed than the transmitter, and thus, the determined WSs may be transmitted serially on the serial link to the receiver. However, in other embodiments, it may be possible to transmit the WSs in parallel on the link coupling the transmitter to the receiver.

FIG. 3 illustrates a state diagram of selecting wire states based on currently received symbols, according to an example. In one embodiment, each symbol is represented using a 3-bit number having one of five values: 000, 001, 010, 011 and 100. The symbol values determine the transitions between the WSs in the state diagram (i.e., +x, −x, +y, −y, +z, −z). That is, the symbols determine the transition from a current WS to the next WS. For example, if the current WS is +y and the next symbol is 001, then the state diagram illustrates that the next WS is −x. In contrast, if the next symbol was 011, then the next WS would be −z.

These transitions are derived from the 3-bit symbol value where each bit defines a particular WS change parameter: flip, rotate, and polarity. In this example, the least significant bit of the 3-bit symbol value is Polarity, which indicates whether the polarity changes state from the previous wire state. When Polarity is "one" then the Wire State transmitted during symbol interval N has a polarity that is opposite that of the Wire State transmitted during symbol interval N−1 (i.e. from positive: +x, +y, +z to negative: −x, −y, −z; or negative to positive). If Polarity is "zero" then the polarity of the Wire State transmitted during symbol interval N remains the same as the Wire State transmitted during symbol interval N−1.

The next least significant bit of the 3-bit symbol value is Rotation, which indicates the direction of rotation from the Wire State transmitted during symbol interval N−1 compared to the Wire State transmitted during symbol interval N. When Rotation is one, then the direction of rotation is clockwise in the state diagram (e.g., transition from +y to −z). Else, when Rotation is zero then the direction of rotation is counterclockwise (e.g., transition from +y to −x).

The most significant bit of the 3-bit symbol value is Flip, which indicates there is only a polarity change in the next Wire State but the Wire State does not rotate to a different phase. A Flip causes a transition between states +x and −x, between +y and −y, or between +z and −z. The flip transitions are represented by the double headed arrows in FIG. 3. When the flip bit is one then the phase is the same as the previous Wire State but the polarity is opposite of the polarity in the previous Wire State. Also, when Flip is one then the values of Rotation and Polarity for the same corresponding symbol are ignored (e.g., are do not cares), and are both set to zero. FIG. 3 illustrates the flip, rotate, and polarity bits for the 30 possible state transitions.

In sum, in this example, a zero polarity bit results in the same polarity as the previous WS while a one polarity bit means the opposite polarity. A zero rotation bit means the counterclockwise rotation while a one rotation bit results in a clockwise rotation (note that a counterclockwise rotation is equivalent to two clockwise rotations, and vice versa). When the flip bit is one, only the polarity changes (no rotation). Thus, flipping the WS is the same as a polarity change with no rotation.

FIG. 4 is a truth table 400 for the symbols, according to examples. As shown, the symbol 000 results in, relative to the previous WS, two clockwise (CW) rotations (or stated differently, one counter clockwise (CCW) rotation) and no change in polarity. The symbol 001 results in, relative to the previous WS, a two CW rotations (or one CCW rotation) and a change in polarity. The symbol 010 results in, relative to the previous WS, one CW rotation (or two CCW rotations) and no change in polarity. The symbol 011 results in, relative to the previous WS, one CW rotation (or two CCW rotations) and a change in polarity. The symbol 1XX (where the X's indicate the rotation and polarity bits are ignored) result in changing the polarity with no rotation, relative to the previous WS.

Notably, FIGS. 3 and 4 indicate the transitions caused by the symbols relative to the previous WS (e.g., WS N−1, where N is the current WS being calculated). However, as mentioned in FIGS. 1 and 2, the embodiments herein can calculate the current WS N without knowing the previous WS N−1. This process is explained in detail in FIGS. 5 and 6.

FIG. 5 illustrates an example of converting symbols into WSs, according to an example. That is, FIG. 5 illustrates an example where the symbol encoder has received the four symbols S0-S3. The chart 500 illustrates the previous WS and the next WS for these symbols. That is, when receiving S0-S3, assume the previous WS was +x. Since S0 is 000, the next WS is +z (as shown by the state diagram). Thus, +z is the previous WS for S1. Since S1 is 001, the next WS is −y. Thus, −y is the previous WS for S2, and so forth.

However, the next WS can be determined without knowing the previous WS. For a Symbol 'N', the symbol encoder can count the number of effective rotation changes where 1 is CW and 0 is CCW (or two CW rotations). Thus, in the example shown in chart 500, the rotation bits (e.g., the middle or second most significant bits) for S0-S3 are 0, 0, 1, and 0. Thus, the final rotation of the S3 is y. The symbol encoder can determine the rotation for the symbols by evaluating the rotation bits of the current and previous symbols and by the knowing the last WS of the previous set (e.g., +x). As such, the rotation can be determined without having to know the previous WS for each of the symbols.

The equation for rotation can be represented as:

```
            // S – bit2:flip,bit1:rotation,bit:0 polarity
for (i=0;i<=n;i++) begin
            // Rotation
            If ( Si == 'b1xx )
                Ri = 0;
            Else if ( Si == 'b01x)
                Ri = 1;
            Else if ( Si == 'b00x)
                Ri = 2;
    End
    T_{RO} = R0
```

7

-continued $$T_{R1} = \text{mod3}(R0 + R1)$$
$$T_{R2} = \text{mod3}(R0 + R1 + R2)$$
$$\vdots$$
$$T_{Rn} = \text{mod3}(R0 + R1 + R2 \dashrightarrow Rn)$$

The polarity for the WS can be generated, for a symbol 'N', by the symbol encoder counting the number of effective polarity changes. In the example in chart 500, the polarity bits for S0-S3 (i.e., the rightmost bits or the least significant bits) are 0, 1, 0, 1. Since the plurality of the previous WS was +, the change in plurality can be expressed as +(i.e., the polarity of +x). +(no change since the plurality bit for S0 is 0), −(a change since the plurality bit for S1 is 1), −(no change since the plurality bit for S2 is 0), and +(a change since the plurality bit for S3 is 1). Thus, the WS for S3 has +polarity. When combined with the rotation calculation above, the WS for S3 is +y, which was determined without having to know the previous WS (i.e., the WS for S2).

Generalizing, the polarity for the Nth symbol is Polarity for Nth Symbol can be determined by XORing of all symbols from 1 to N in the current set. The polarity for each symbol can expressed in the following equations:

```
// S – bit2:flip,bit1:rotation,bit:0 polarity
for (i=0;i<=n;i++) begin
        // Polarity
        If ( ( Si == 'b1xx) || ( Si == 'b0x0))
                Pi = 0;
        Else if ( Si == 'b0x1)
                Pi = 1;
end
TP0 = P0
TP1 = P0 ^ P1
TP2 = P0 ^ P1 ^ P2
        :
TPn = P0 ^ P1 ^ P2 --- ^ Pn
```

The equations for arriving at the Nth wire state can be expressed as:

Initial Polarity & Rotation Calculation                    Eq-1

$$// S - \text{bit2:flip, bit1:rotation, bit:0}$$

$$\text{for } \left(i = 0; i <= n; i++\right) \text{ begin}$$

$$// \text{ Polarity}$$

$$\text{If } ((Si == 'b1xx) \, || \, (Si == 'b0x0))$$

$$Pi = 0;$$

$$\text{Else if } (Si == 'b0x1)$$

$$Pi = 1;$$

$$// \text{ Rotation}$$

$$\text{If } (Si = 'b1xx)$$

$$Ri = 0;$$

$$\text{Else if } (Si == 'b01x)$$

$$Ri = 1;$$

$$\text{Else if } (Si == 'b00x)$$

$$Ri = 2;$$

$$\text{end}$$

8

Final Total Rotation Calculation                    Eq-2

$$T_{R0} = R0$$

$$T_{R1} = \text{mod3}(R0 + R1)$$

$$T_{R2} = \text{mod3}(R0 + R1 + R2)$$

$$\vdots$$

$$T_{Rn} = \text{mod3}(R0 + R1 + R2 \dashrightarrow Rn)$$

To Final Total Polarity Calculation                    Eq#3

$$T_{P0} = P0$$

$$T_{P1} = P0^\wedge P1$$

$$T_{P2} = P0^\wedge P1 {}^\wedge P2$$

$$\vdots$$

$$T_{Pn} = P0^\wedge P1^\wedge P2 \text{ --- }^\wedge Pn$$

Final Wire state Calculation                    Eq#4

$$\text{for } \left(i = 0; i <= n; i++\right) \text{ begin}$$

$$Wi = T_{P0}? \sim \text{Rotate(prev\_state, } T_{RI}):\text{Rotate(prev\_state, } T_{RI}):$$

$$\text{end}$$

$$\text{prev\_state} = Wn;$$

Figure 6:
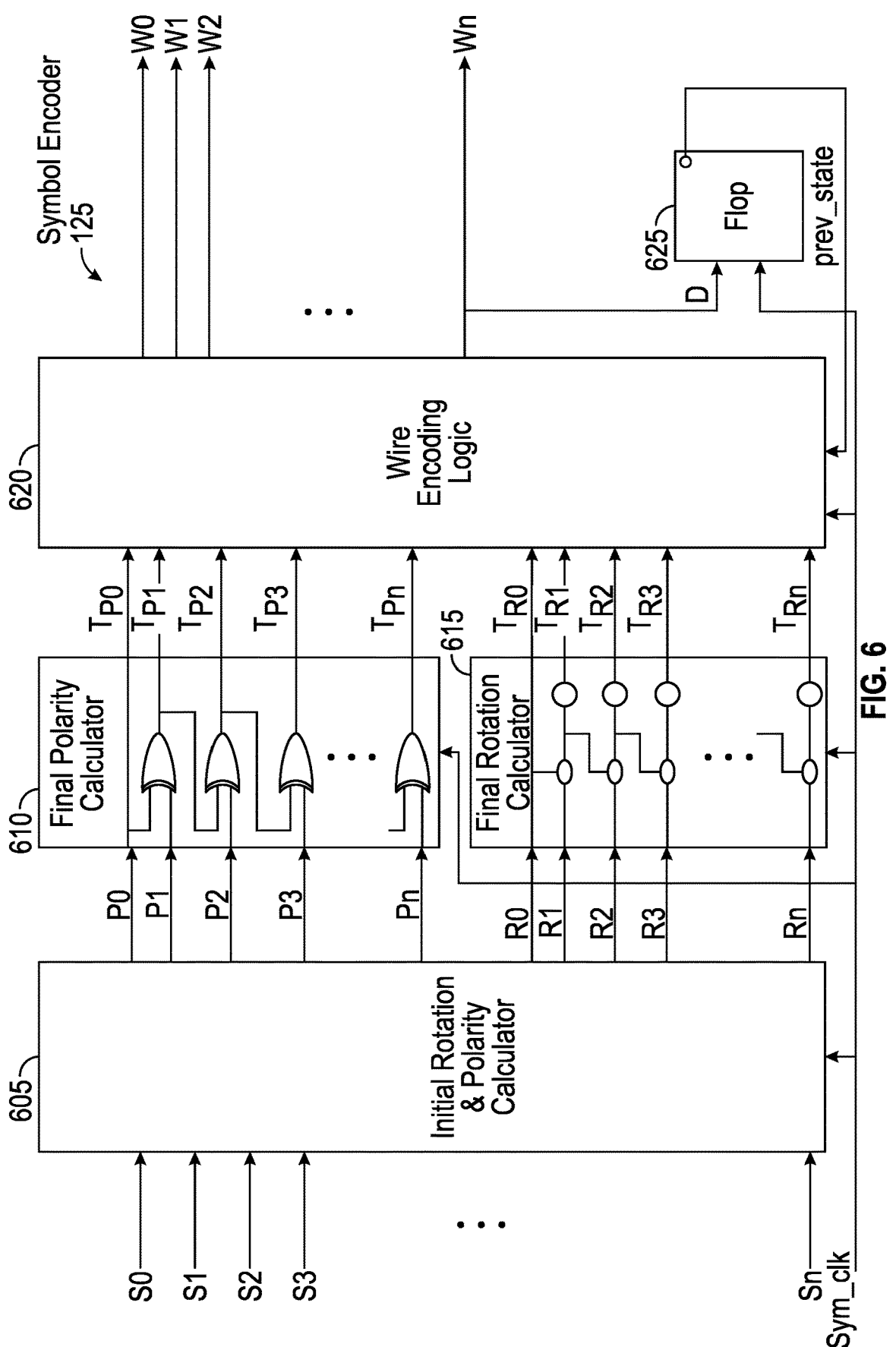
FIG. 6 illustrates circuitry for converting multiple symbols into respective wire states in parallel, according to examples.

FIG. 6 is a block diagram for a symbol encoder 125 for converting multiple symbols into respective wire states in parallel, according to examples. In this example, the symbol encoder 125 includes an initial rotation and polarity calculator 605 which has outputs coupled to a final polarity calculator 610 and a final rotation calculator 615. As shown, the calculator 605 receives the symbols S0-Sn from the symbol mapper (not shown). The calculator 605 then generates initial polarity values (P0-Pn) and initial rotation values (R0-Rn) for the symbols S0-Sn.

Using the polarity values P0-Pn, the final polarity calculator 610 counts the number of polarity changes for each of the symbols. That is, as discussed above, the final polarity calculator 610 can evaluate the polarity bits for all the previous symbols in the set to determine how many times the polarity changes.

Using the rotation values R0-Rn, the final rotation calculator 615 counts the number of rotational changes for each of the symbols. As discussed above, the final rotation calculator 615 can evaluate the rotation bits for all the previous symbols in the set to determine the number of CW or CCW rotations.

Wire encoding logic 620 receives the total polarity changes output by the final polarity calculator 610 (i.e., $T_{P0}$-$T_{Pn}$) and the total rotation output by the final rotation calculator 615 (i.e., $T_{R0}$-$T_{Rn}$) and the last WS from the previous set of WSs generated by the symbol encoder 125. This last WS is saved in the flop 625 (or any suitable type of memory element). With this information, the wire encoding logic 620 calculates the WSs for each of the symbols (i.e., W0-Wn).

Moreover, the wire encoding logic 620 stores the last WS in the current set (i.e., Wn) in the flop 625 so it can then be used to generate the WS for the next set of symbols S0-Sn received at the symbol encoder 125 at the next clock cycle.

In one embodiment, the symbol encoder 125 outputs a new set of wire states W0-Wn each clock cycle. That is, during each clock cycle the symbol encoder 125 receives a new set of symbols S0-Sn which it processes using combinational logic or combination circuitry in the calculators 605, 610, and 615 and the wire encoding logic 620 to output a corresponding set of wire states W0-Wn in the same clock cycle.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product.

Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A transmitter, comprising:
   a symbol mapper comprising circuitry configured to map data into a plurality of symbols having a defined order;
   a symbol encoder configured to receive the plurality of symbols from the symbol mapper in parallel, the symbol encoder comprising circuitry configured to convert the plurality of symbols into respective wire states concurrently using parallel logic circuitry and without relying on prior symbol transitions, and to output the wire states in parallel in a same clock cycle; and
   an interface configured to transmit the wire states to a receiver using a link.

2. The transmitter of claim 1, wherein converting the plurality of symbols into the respective wire states in parallel is configured to lower clock speeds of the transmitter.

3. The transmitter of claim 1, wherein each of the plurality of symbols comprises a rotation bit and a polarity bit.

4. The transmitter of claim 3, wherein the rotation bits indicate a rotation to a different wire state and the polarity bits are used to determine a polarity of the respective wire states.

5. The transmitter of claim 4, wherein each of the plurality of symbols comprises a flip bit indicating that a polarity should change without any rotation.

6. The transmitter of claim 1, wherein the symbol encoder is configured to determine a respective wire state for a first (N) symbol of the plurality of symbols without having to first determine a respective wire state for a previous (N−1) symbol of the plurality of symbols.

7. The transmitter of claim 1, wherein the transmitter is part of an integrated circuit.

8. The transmitter of claim 1, wherein a physical layer of the transmitter is compatible with the MIPI C-PHY specification.

9. The transmitter of claim 8, wherein the plurality of symbols are based on a 3-phase symbol encoding defined by the MIPI C-PHY specification.

10. A method, comprising:
   converting data into a plurality of symbols;
   providing the plurality of symbols to a symbol encoder in parallel;

encoding, by the symbol encoder, the plurality of symbols into respective wire states concurrently using parallel logic circuitry and without relying on transitions between symbols, and outputting the wire states in parallel in a same clock cycle; and
   transmitting, via a transmitter, the wire states to a receiver using a link.

11. The method of claim 10, wherein encoding the plurality of symbols into the respective wire states in parallel is configured to lower clock speeds of the transmitter.

12. The method of claim 10, wherein each of the plurality of symbols comprises a rotation bit and a polarity bit.

13. The method of claim 12, wherein the rotation bits indicate a rotation to a different wire state and the polarity bits are used to determine a polarity of the respective wire states.

14. The method of claim 13, wherein each of the plurality of symbols comprises a flip bit indicating that a polarity should change without any rotation.

15. The method of claim 10, wherein encoding the plurality of symbols into respective wire states comprises:
   determining a respective wire state for a first (N) symbol of the plurality of symbols without having to first determine a respective wire state for a previous (N−1) symbol of the plurality of symbols.

16. A transmitter comprising:
   a symbol mapper comprising circuitry configured to map data into a plurality of symbols having a defined order;
   a symbol encoder configured to receive the plurality of symbols from the symbol mapper in parallel, the symbol encoder comprising circuitry configured to convert the plurality of symbols into respective wire states concurrently using parallel logic circuitry and without relying on transitions between symbols and to output the wire states in parallel in a same clock cycle to lower clock speeds of the transmitter; and
   an interface configured to transmit the wire states to a receiver using a link.

17. The transmitter of claim 16, wherein each of the plurality of symbols comprises a rotation bit and a polarity bit.

18. The transmitter of claim 17, wherein the rotation bits indicate a rotation to a different wire state and the polarity bits are used to determine a polarity of the respective wire states.

19. The transmitter of claim 18, wherein each of the plurality of symbols comprises a flip bit indicating that a polarity should change without any rotation.

20. The transmitter of claim 16, wherein the symbol encoder is configured to determine a respective wire state for a first (N) symbol of the plurality of symbols without having to first determine a respective wire state for a previous (N−1) symbol of the plurality of symbols.

* * * * *